US010079530B2

(12) United States Patent
Mao et al.

(10) Patent No.: US 10,079,530 B2
(45) Date of Patent: Sep. 18, 2018

(54) LINEAR VIBRATION MOTOR

(71) Applicants: Lubin Mao, Shenzhen (CN); Hongxing Wang, Shenzhen (CN)

(72) Inventors: Lubin Mao, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 332 days.

(21) Appl. No.: 15/005,045

(22) Filed: Jan. 25, 2016

(65) Prior Publication Data

US 2016/0365784 A1 Dec. 15, 2016

(30) Foreign Application Priority Data

Jun. 15, 2015 (CN) ..................... 2015 2 0413181 U

(51) Int. Cl.
*H02K 33/00* (2006.01)
*H02K 33/16* (2006.01)
*H02K 7/08* (2006.01)

(52) U.S. Cl.
CPC ............. *H02K 33/00* (2013.01); *H02K 33/16* (2013.01); *H02K 7/08* (2013.01)

(58) Field of Classification Search
CPC . H02K 5/16–5/1737; H02K 7/08–7/09; H02K 33/00–35/06
See application file for complete search history.

(56) References Cited

U.S. PATENT DOCUMENTS

| | | | | |
|---|---|---|---|---|
| 6,466,682 | B2 | 10/2002 | An | |
| 7,099,489 | B2 | 8/2006 | Pan et al. | |
| 2008/0258566 | A1* | 10/2008 | Shimizu ............ | A61C 17/3445 310/12.04 |

FOREIGN PATENT DOCUMENTS

| | | |
|---|---|---|
| CN | 200480000815.4 | 11/2005 |
| CN | 200910105497.2 | 7/2009 |

* cited by examiner

*Primary Examiner* — Ramon M Barrera
(74) *Attorney, Agent, or Firm* — Na Xu; IPro, PLLC

(57) ABSTRACT

A linear vibration motor is disclosed. The linear vibration motor includes a housing, a vibrator placed in the housing and an elastic component providing the vibrator with restoring force of vibration. The linear vibration motor also comprises a guide device including an internal guide device, an external guide device, a ball location device arranged between the internal guide device and the external guide device and fixed relative to the housing, and multiple balls positioned on the ball location device. The balls are propped against the external guide device and the internal guide device respectively. Moreover, the rollers will roll in presence of drive effect of the internal guide device and roll at the permanent position. The vibrator is propped in the housing by using the balls.

9 Claims, 5 Drawing Sheets

10 30 12 14 141 144 142 143 131 13 132a 132 132b 20

LINEAR VIBRATION MOTOR

FIELD OF THE INVENTION

The present disclosure is related to motors, specifically to a linear vibration motor for converting electric signals to mechanical vibration which is sensible for human body.

DESCRIPTION OF RELATED ART

A vibration motor shall be applied to feedback of system generally, for example, incoming call prompt of mobile phone, vibration feedback of game player, etc. for the portable consumer electronic products, such as a mobile phone, a handheld game player, a navigation unit or a handheld multimedia entertainment equipment; and the motor used mainly refers to several types, such as columnar core motor, coreless motor and flat vibration motor.

All kinds of components of the internal part thereof are required to adapt to the trend of light and thin along the development direction of light and thin consumer electronic products. The motor is not of exception.

A linear vibration motor is characterized in that the vibration direction of the vibration unit refers to straight reciprocating motion and has been applied and installed on the consumer electronic products widely because of stable vibration and small noise thereof. Please refer to Chinese patent application No. CN200480000815.4 publicized on Nov. 23, 2005, U.S. Pat. No. 6,466,682 publicized on Oct. 15, 2002, U.S. Pat. No. 7,099,489 publicized on Aug. 29, 2006, etc.

However, the vibration direction of the vibration unit of the said vibration motor involves the vertical direction, that is, vertical to the installation plane; and great vertical height is required to provide because the vibration direction is vertical to the installation plane in order to facilitate up-and-down motion of the vibration unit and increase the height of the whole motor. Yet, it is not useful for development of thin motor.

On this basis, the vibration motor with vibration direction vertical to the thickness direction of the device where the vibration motor is located was studied. For example, the Chinese patent application No.: 200910105497.2 publicized on Jul. 22, 2009 disclosed the vibration motor of suspending the vibrator in the housing by using the spring component, wherein the problem that the said vertical vibration motor required great vibration space was solved excellently by setting the vibration direction of the vibrator parallel with the installation surface of the vibration motor (transverse vibration) by using the magnetic circuit and the coils set in advance.

The vibrator of the said transverse vibration motor was suspended by using the spring component, and the spring component received the elastic restoring force offered to the vibrator through extrusion and releasing continuously during vibrating process of the vibrator. However, the sense of vibration was reduced because the vibrator vibrated transversely during vibrating process due to flaky structure of the spring component and cannot move excellently along the straight line as a result of reversion of the elastic deformation of the spring component.

Therefore, it is necessary to provide a new linear vibration motor to overcome the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the Fig.s and the embodiment. It should be understood the specific embodiment described hereby is only to explain this disclosure, not intended to limit this disclosure.

Figure 1:
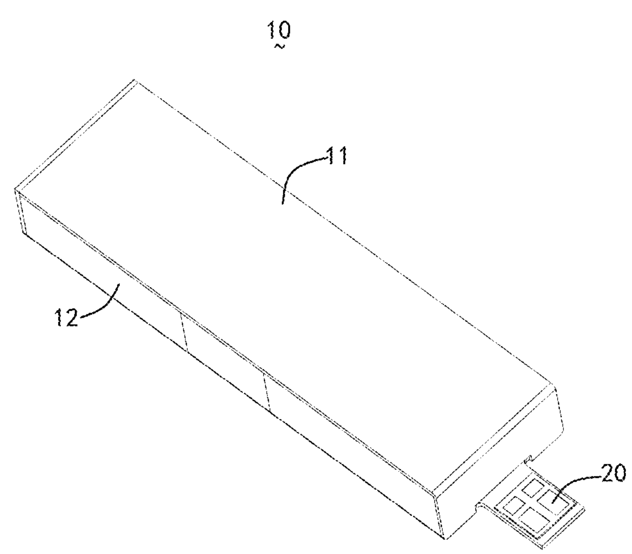
FIG. 1 is an isometric view of a linear vibration motor in accordance with an exemplary embodiment of the present disclosure.

A linear vibration motor 100, in accordance with an exemplary embodiment of the present disclosure, is shown in the FIG. 1 and comprises a cover 11 and a housing 12 forming the accommodation space with the cover 11, as well as a conducting end 20 connecting with the external circuit in order to receiving the external electric signal.

In the embodiment, the housing is formed by a cover 11 and a housing 12 which can be set by using other mode according to different manufacturing processes or assembling processes, for example, the cover 11 and the housing 12 can be formed integrally, or the cover 11 has the structure of the housing 12, or the housing 12 has the structure of the cover 11. In short, the housing formed by the cover 11 and the housing 12 shall offer a accommodation space to accommodate other components of the linear vibration motor 100 therein. As for the materials of the cover 11 and the housing 12, the available material of the linear vibration motor, or metal, or plastic, or mixture of the metal and the plastic can be adopted. What shall be explained is that the so-called housing shall involve both appearance components forming the linear vibration motor 100, appearance components and other components which are fixed with respect to the appearance components. Further, the housing can be the stator in the vibration motor; and the so-called stator shall involve the components (such as housing, the cover) or set of the components (except other components of the vibrator) which is immobile with respect to the installation location of the linear vibration motor.

Figure 2:
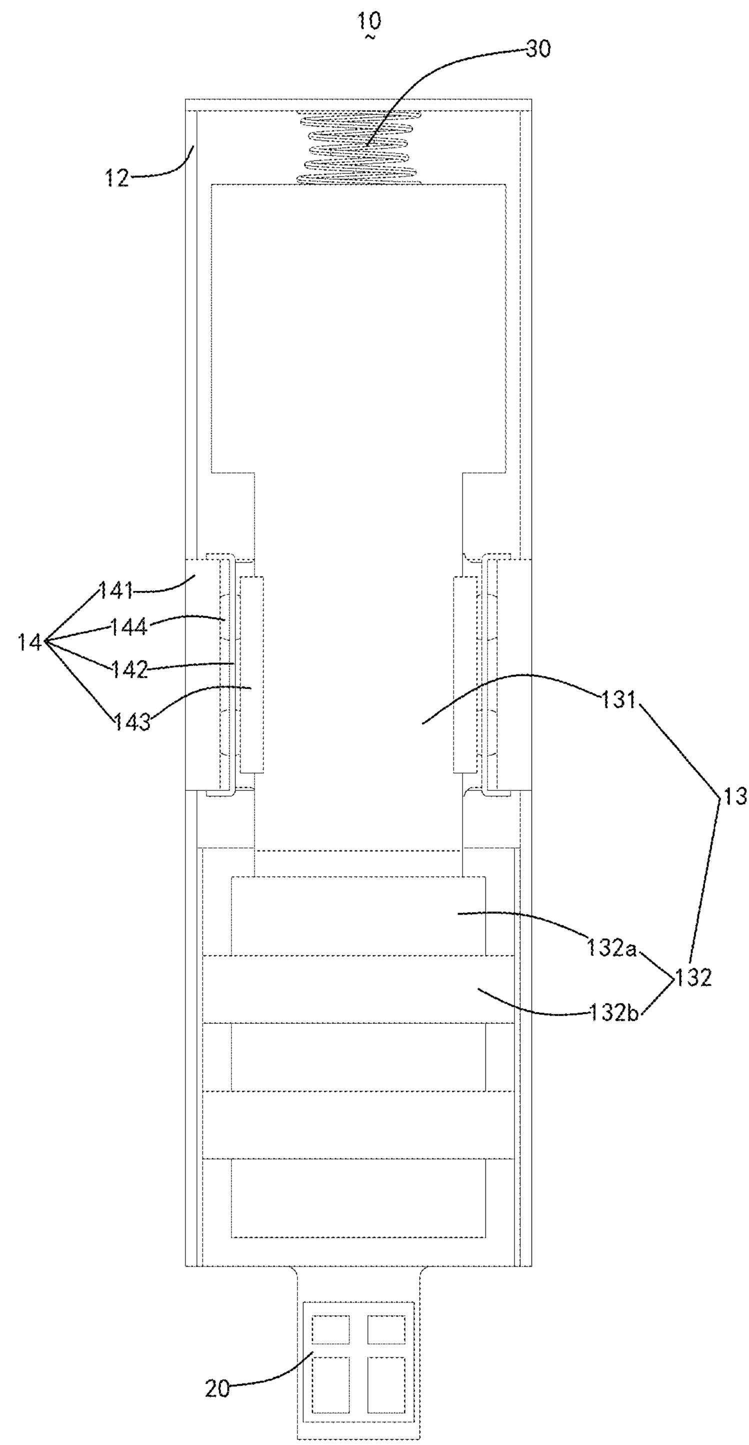
FIG. 2 is a top view of the linear vibration motor in FIG. 1, wherein a cover of the linear vibration motor is removed in order to facilitate viewing.

The structure of the internal part of the accommodation space is displayed in the FIG. 2 clearly, and the cover 11 has been removed. In view of the long-strip housing, the components of the internal part shall be shaped as long strips approximately. The internal components include a vibrator

13, a guide device 14 suspending the vibrator 13, and an elastic component 30 providing the vibrator 13 with elastic restoring force. The vibrator 13 further comprises a mass 131 and a drive device 132 assembling and connecting with the mass 131. In the embodiment, the mass 131 is located on one end of the drive device 132, that is, both of them are located on two ends of the vibrator 13. Actually, the drive device 132 is used for driving vibrations of the whole vibrator 13, and the mass 131 is used for improving the amplitude by increasing the driving force; therefore, the positional relationship of the two parts is not limited to what is shown in FIG. 2, and can be arranged in the forms of other structures, for example, the mass includes two parts, while the drive device is arranged among the two masses; or the drive device includes two parts, and the mass is arranged among the two drive device; and the said structures are feasible. What shall be explained is that the elastic component 30 can be spring, leaf spring or other devices which can be compressed and released, such as compressed air device, magnetic attracting/repelling device, etc.

Further, the drive device 132 includes a magnet 132*a* and multiple coils 132*b*. surrounding the magnet 132*a*. Moreover, see contents in background technology of the parent application document or the technical content of the available parent quoted in the background technologies for interaction of the magnet and the coils of the transverse linear vibration motor, and the embodiment shall not repeat it any longer.

The guide device 14 comprises an external guide device 141, a ball location device 142, an internal guide device 143 and multiple balls 144. The external guide device 141 is fixed in the housing 12 and is one part of the housing in this embodiment, or not one part of the housing in other feasible shape, for example, being installed at the internal part of the accommodation space of the housing, or on the stator of the vibration motor. The ball location device 142 is applied to limitation of locations of multiple balls 144, that is, the locations of the balls 144 are immobile relatively on the ball location device, except rolling of the balls of course. The internal guide device 142 is fixed on the mass 131 and the ball location device 142 is arranged between the internal guide device 142 and the external guide device 141 in the way of clamping; and the so-called installation in the way of clamping shall purely involve the positional relationship, rather than the combining relationship of the two devices, that is, the ball location device 142 is arranged between the external guide device 141 and the internal guide device 143. At the same time, the ball location device 142 is moveable with respect to the stator. The external guide device 141 is fixed on the housing and the internal guide device 143 is fixed on the mass 131 (or on the vibrator 13) in the embodiment. Therefore, the external guide device 141 is combined with the stator actually, while the internal guide device 143 is combined with the vibrator. The guide device 14 shall be optionally arranged at a center of gravity of the vibrator 13 or the place nearby in order to support the vibrator 13 stably and provide stable vibration locus. The balls 134 pass through the ball location device 142 and the part of the same located on two sides of the ball location device 142 is propped up the external guide device 141 and the internal guide device 143. When the vibrator 13 vibrates, the internal guide device 143 shall vibrate with the vibrator; while the balls 144 shall roll in the internal guide device 143 oppositely.

Figure 3:
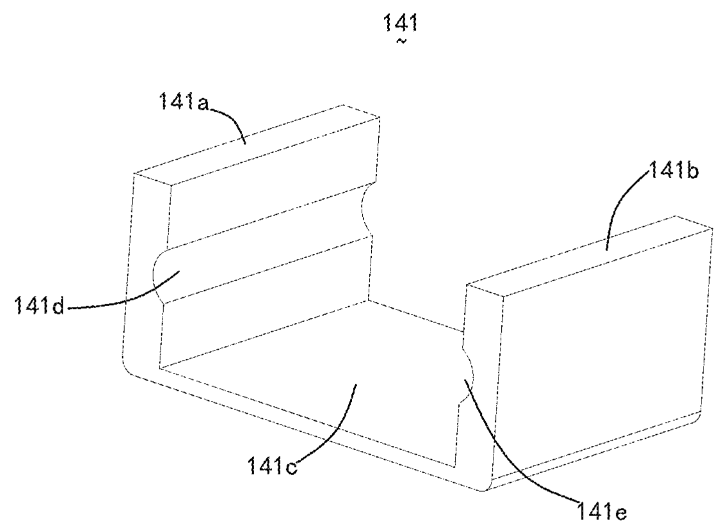
FIG. 3 is an isometric view of an external guide device of a guide device of the linear vibration motor in FIG. 1.

The isometric view of the external guide device 141 is shown in FIG. 3, and the external guide device 141 comprises a first side wall 141*a* and a second side wall 141*b* which are opposite to each other, and a bottom ball 141*c* connecting one end of the first side wall 141*a* and the second side wall 141*b*. A first guide slot 141*d* is provided on the first side wall 141*a* while a second guide slot 141*e* is provided on the second side wall 141*b*. Moreover, the first side wall 141*a* and the second side wall 141*b* are located on two sides of the vibrator 13 respectively and are immobile with respect to the stator after being assembled as shown in FIG. 7.

Figure 4:
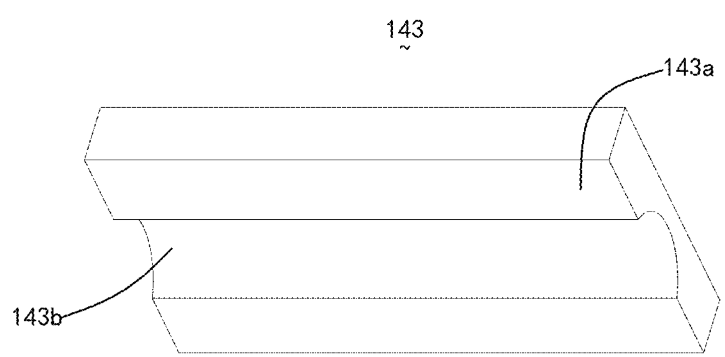
FIG. 4 is an isometric view of an internal guide device of the guide device of the linear vibration motor in FIG. 1.

The isometric view of the internal guide device 143 is shown in FIG. 4, and the internal guide device 143 comprises a main body 143*a* and an internal guide slot 143*b* arranged on the main body 143. The linear vibration motor has two internal guide devices 143 which are located on two sides of the vibrator and corresponding to the first side wall 141*a* and the second side wall 141*b* of the external guide device (referring to FIG. 7). Of course, the internal guide device, like the external guide device, can be formed as the integral structure having the bottom wall as long as the vibrator has the structure corresponding to the external guide device. Similarly, the external guide device may have two independent components which are fixed on the housing or the stator respectively and will not affect the moving relationship with the internal guide device.

Figure 5:
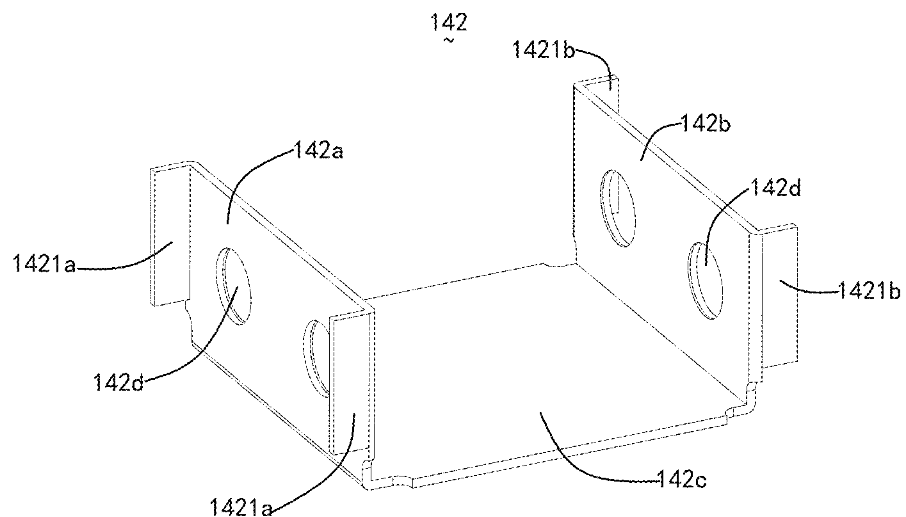
FIG. 5 is an isometric view of a ball location device of the guide device of the linear vibration motor in FIG. 1.

The isometric view of the ball location device 142 is shown in FIG. 5, and the ball location device 142 comprises a first location wall 142*a* and a second location wall 142*b*. which are opposite to each other and a connecting wall 142*c* connecting the first location wall and the second location wall. At the same time, multiple location holes 142*d* are provided on the first location wall 142*a* and the second location wall 142*b*. As previously mentioned, the ball location device 142 may include two independent components but not have the connecting wall 142*c*. In addition, the first location wall 142*a* includes a pair of first blocking wall 1421*a,* and the second location wall 142*b* includes a pair of second blocking wall 1421*b*.

Figure 6:
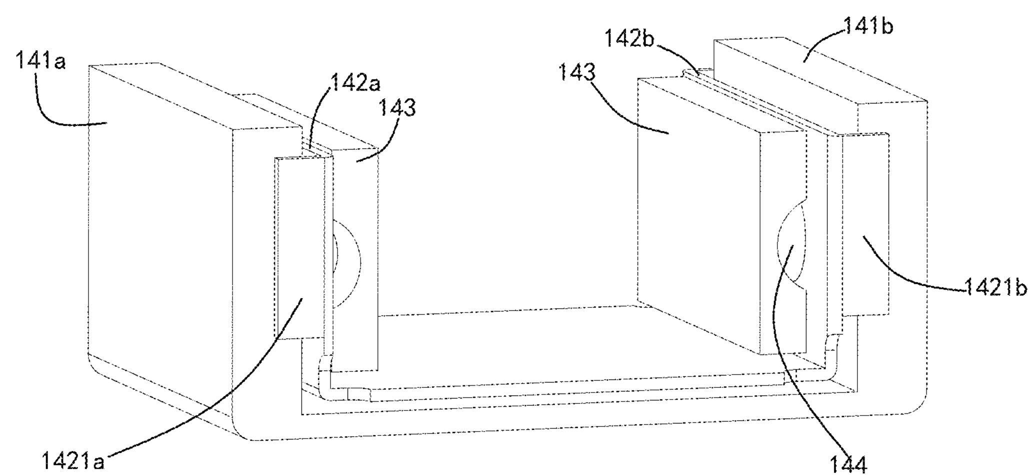
FIG. 6 is an isometric view of an assembly of the external guide device, the internal guide device and the ball location device in FIGS. 3-5.
Figure 7:
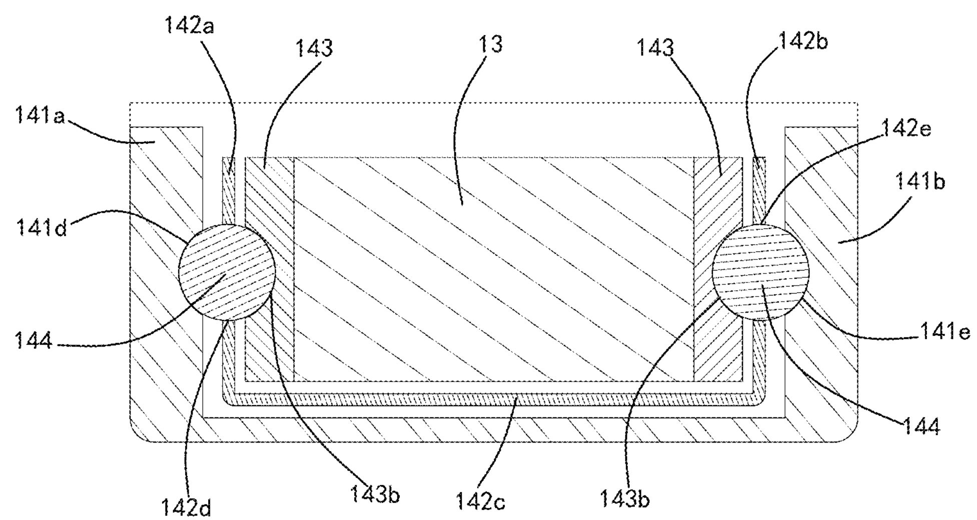
FIG. 7 is a cross-sectional view of the linear vibration motor taken along Line VII-VII in FIG. 2.

As shown in FIG. 6 and FIG. 7, the first location wall 142*a* is positioned between the internal guide device 143 and the first side wall 141*a,* and the second location wall 142*b*. is positioned between the internal guide device 143 and the second side wall 141*b* when the external guide device, the internal guide device and the ball location device are assembled together. At the same time, the first side wall 141*a* is located between the first blocking walls 1421*a* of the first side wall 142*a,* and the second side wall 141*b* is located between the second blocking walls 1421*b,* for restricting the position of the ball location device. The ball 144 is arranged in a first location hole 142*d* of the first location wall 142*a,* one end of the same shall be accommodated in the first guide slot 141*d* of the external guide device, and the other end of the same shall be accommodated in the internal guide slot 143*b* of the internal guide device. Further, the ball 144 is arranged in the second location hole 142*e* of the second location wall 142*b,* one end of the same shall be accommodated in the second guide slot 141*e* of the external guide device, and the other end of the same shall be accommodated in the internal guide slot 143*b* of the internal guide device. A gap is reserved between the bottom of the vibrator and the connecting wall 142*c* of the ball location device in order to facilitate vibration. Further, the positional relationship of the balls and the ball location device will not be changed because the ball location device is moveable opposite to the stator, while the opposite positions of the ball and the external guide device and the opposite position of the ball and the internal guide device will be changed along vibration of the vibrator. Moreover, rolling friction occurs between the external guide device and the ball and the internal guide device and the ball with minimum friction force; therefore, the vibrator can vibrate smoothly.

The balls can be driven to roll by the internal guide device during vibrating process of the vibrator. The ball location device is restricted to be fixed relative to the stator, so, the relative positions of the balls, the ball location device and the external guide device cannot be changed. Therefore, the vibrator is suspended in the housing by the balls actually and vibrates along extension direction of the guide slot and the internal guide slot. In this way, the vibration direction of the vibrator is limited in the extension direction of the guide slot and the internal guide slot.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor including:
- a housing,
- a vibrator placed in the housing;
- an elastic component providing the vibrator with restoring force;
- a guide device, including:
- an internal guide device fixed on the vibrator,
- an external guide device fixed on the housing corresponding to the internal guide device,
- a ball location device arranged between the internal guide device and the external guide device, the ball location device being fixed relative to the housing;
- a plurality of balls positioned on the ball location device, the balls abutting against the external guide device and the internal guide device respectively by passing through two sides of the ball location device,
- wherein the internal guide device is fixed on one side of the vibrator and comprises a main body and an internal guide slot arranged on the main body; the external guide device comprises a first side wall corresponding to the internal guide device and a first guide slot arranged on the first side wall; the ball location device comprises a first location wall located between the first side wall and the internal guide device, and a plurality of first location holes arranged on the first location wall; the balls are placed in the first location holes, and parts of the balls positioned on two sides of the first location wall are accommodated in the first guide slot and the internal guide slot, respectively.

2. The linear vibration motor according to claim 1, wherein the external guide device is one part of the housing.

3. The linear vibration motor according to claim 1, wherein the internal guide device is one part of the vibrator.

4. The linear vibration motor according to claim 1, wherein another internal guide device is fixed on the other side of the vibrator; the external guide device comprises a second side wall corresponding to the another internal guide device and a second guide slot arranged on the second side wall; the second side wall and the first side wall are positioned on two sides of the vibrator, respectively; correspondingly, the ball location device includes a second location wall located between the second side wall and the another internal guide device, and multiple second location holes arranged on the second location wall; the balls are placed in the second location holes and the parts of the balls positioned on two sides of the second location all are placed in the second guide slot and the internal guide slot of the another internal guide device, respectively.

5. The linear vibration motor according to claim 1, wherein the first location wall includes a pair of first blocking walls, and the first side wall is located between the first blocking walls.

6. The linear vibration motor according to claim 4, wherein the second location wall includes a pair of second blocking walls, and the second side wall is located between the second blocking walls.

7. The linear vibration motor according to claim 4, wherein the external guide device further comprises a bottom wall connecting the first side wall and the second side wall.

8. The linear vibration motor according to claim 4, wherein the ball location device further comprises a connecting wall connecting the first location wall and the second location wall.

9. The linear vibration motor according to claim 1, wherein the guide device is positioned at the center of gravity of the vibrator.

* * * * *